C. E. ROBERTS.
DANDELION RAKE.
APPLICATION FILED JUNE 18, 1915.

1,336,861.

Patented Apr. 13, 1920.

Witnesses:

Inventor:
Charles E. Roberts
By Munday, Evarts, Adcock & Clarke Attys.

UNITED STATES PATENT OFFICE.

CHARLES E. ROBERTS, OF OAK PARK, ILLINOIS.

DANDELION-RAKE.

1,336,861.   Specification of Letters Patent.   Patented Apr. 13, 1920.

Application filed June 18, 1915. Serial No. 34,800.

*To all whom it may concern:*

Be it known that I, CHARLES E. ROBERTS, a citizen of the United States, residing in Oak Park, in the county of Cook and State of Illinois, have invented a new and useful Improvement in Dandelion-Rakes, of which the following is a specification.

This invention relates in general to hand rakes and has more particular reference to the provision of rakes for removing the heads of dandelions and the like, although it will be manifest that the invention has a much wider application.

A principal object of the invention is the provision of a dandelion rake which will effectively remove the heads or blooms by simply sliding the rake over the surface of the lawn, the rake being so constructed that the heads thus removed will be carried by the rake for subsequent depositing in a suitable basket or other receptacle.

A further object of this invention is the provision of such a rake having means for effecting quick and complete ejectment into the basket of all the heads and other matter picked up by the rake in its movement over the ground, which ejectment may be effected by mere movement of a hand grasping the handle of the rake without shifting its grip upon the handle.

A further object of the invention is the provision of a rake which will thoroughly clean the lawn of all dried or cut grass, leaves and all other litter, and this without danger of injury to the growing grass.

Other objects and advantages of the invention will be apparent as it is better understood from the following description when considered in connection with the accompanying drawing illustrating a preferred embodiment thereof.

Referring to the drawing.

Figure 1:
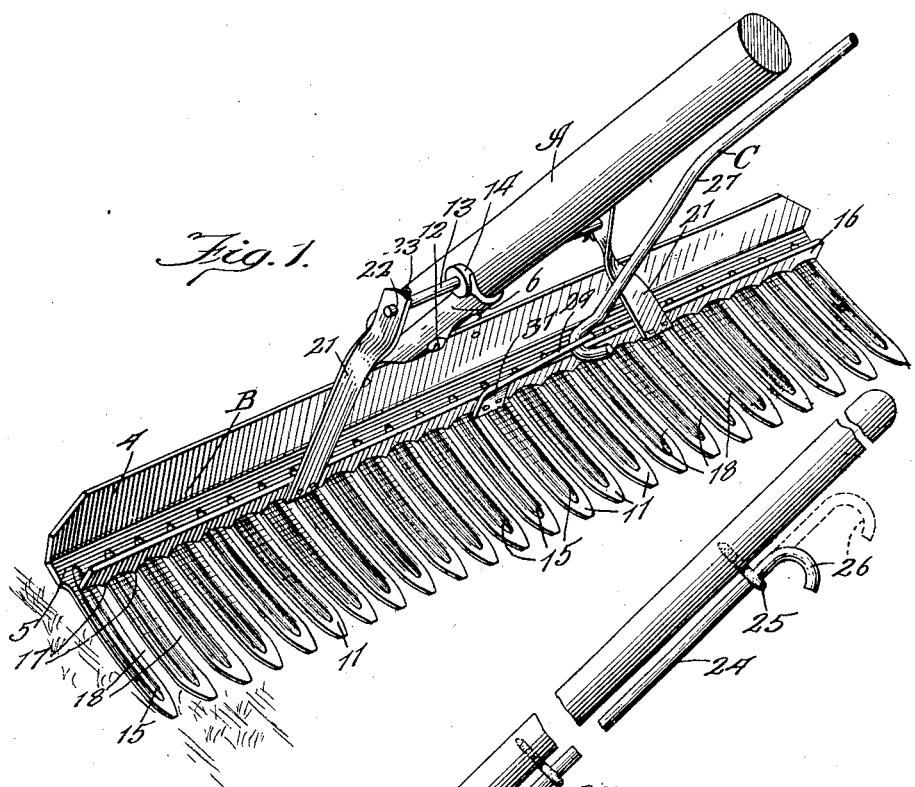
Figure 1 is a perspective view of a lower end of a rake embodying my invention.

The rake shown on the drawing and embodying my invention consists primarily of a handle A, a head B, and a cleaning device C.

The head B of the rake in the present instance consists of a single sheet metal plate of suitable shape and bent longitudinally and angularly to provide a flange 4 and a tooth portion 5. This head is secured to the handle by a saddle 6, preferably of cast iron. This saddle is closed at its lower end by a lug or flange 7, from which extends a lip 8 riveted or otherwise secured to the flange 4 of the head at 9. The lip 8 is disposed angularly with respect to the axis of the handle A and the two parts 4 and 5 of the head meet in an acute angle so that the teeth 11 of the rake lie well back toward the handle so that when the handle is held in raking position the teeth 11 will be disposed almost parallel with the surface of the ground, being only a little higher at their back than at their pointed forward ends. The saddle is secured to the handle by one or more screws 12 extending through the bottom of the saddle and into or through the handle, and also by a pin or rod 13 which, as will be later described, forms the pivot of the cleaner blade. The rod 13 passes through the handle and through lugs 14 disposed upon each side of the handle. The handle is therefore secured in place through a plurality of fastening means angularly disposed with respect to each other.

The teeth 11 are preferably relatively wide and set close together, leaving only sufficient space for the stems of the dandelions to pass between them and not providing sufficient space for buds and blooms to pass through as the rake moves over the ground. In the present instance each tooth 11 is corrugated centrally and longitudinally at 15, the corrugations extending toward the rear face of the teeth and serving to stiffen them, and also to provide smooth, rounded surfaces on which the teeth may ride in use and which prevent entrance of the points of the teeth into the ground. The teeth are curved slightly arcuately to better retain the heads of the dandelions thereon when the rake is lifted from the ground after collecting a number of blooms in order that the rake thus ladened may be carried to a basket and the heads deposited therein, and also to retain the teeth in close proximity to the cleaner in its pivotal movement.

Figure 2:
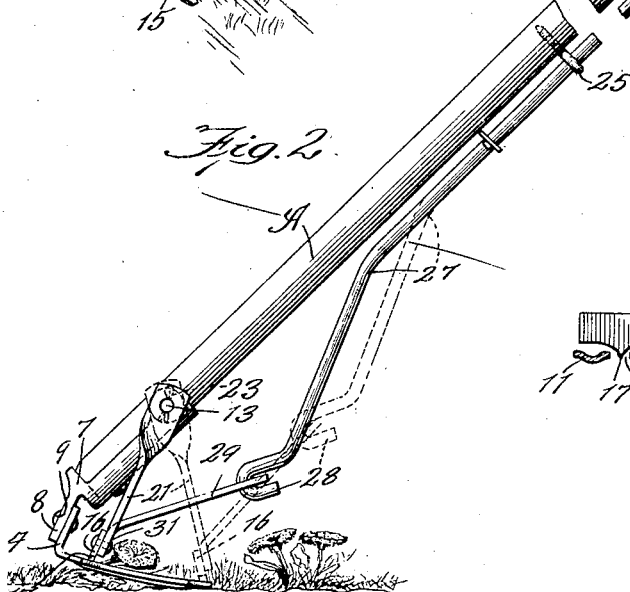
Fig. 2 is a side elevation of the complete rake, part of the handle being broken away.
Figure 3:
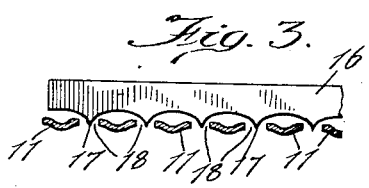
Fig. 3 is a partial sectional view showing certain details of construction.

In order that the rake may be easily emptied of its charge, I provide a cleaner which may be operated by the user without requiring him to stoop over or to change the position of his hands on the handle of the rake. This cleaner, in the present instance, comprises a plate 16 serrated or cut away on its lower edge to provide short teeth 17 extending into the space 18 between the teeth 11. The teeth 17 preferably do not extend an appreciable distance behind the rear face of the teeth 11 in order that they shall not prevent the easy sliding of the rake over the ground. The plate 16 is secured to the ends of two arms 21, which are perforated at 22 and hang from the pivot 13 which extends through the perforations. A pair of cotter pins 23 are provided to hold the plate 16 in accurate position. Operation of the cleaner is effected through a rod 24 extending up along the handle to adjacent its upper end. This rod is slidably mounted in eyes or bearings 25 and is bent at its upper end at 26 for engagement with a finger of a hand grasping the handle. The lower end of the rod is bent outwardly at 27 and therebeneath extends outwardly and downwardly to near the head where it is formed into a hook 28. This hook is connected to an arm 29 fast at one end at 31 to the center of the blade 16 and extends upwardly and forwardly therefrom to its connection with the hook 28. Mere upward sliding of the rod 26 will cause a forward movement of the blade which will clean the head of blooms or other matter collected thereon. In Fig. 2 the operation of the rake on dandelions is illustrated and the movement of the cleaner is also indicated, the position in full lines being its normal position in raking and the position in dotted lines being its position at the end of its cleaning stroke. The formation of the teeth of the head and their slight curvatures enable them to readily pick up and retain the heads of the bloom until the rake is held over a basket or other receptacle and the cleaner operated as described.

Although the rake has been described as being particularly adapted for the collecting of dandelion heads, it will be manifest that it has many other uses, and certain features of the rake illustrated and described are applicable to rakes of other character.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A rake for dandelions and the like comprising a handle, a head provided with teeth carried thereby, the teeth of said head being mounted close together and disposed at an acute angle with respect to said handle, said teeth being arcuately curved throughout a greater part of their length to retain blooms pulled from their stems, and means for pushing said blooms from said teeth.

2. A rake for dandelions and the like comprising a handle and a head carried thereby, said head having teeth adapted to slide over the ground at a sharp angle thereto and sit close together to gather dandelion and other blooms therefrom, and a cleaning element moving over said teeth and comprising a serrated plate, the serrations of said plate fitting the teeth and extending only substantially to the rear face of said teeth.

3. A rake for dandelions and the like, comprising a handle, a head provided with teeth carried thereby, the teeth of said head being mounted close together and disposed at an acute angle with respect to said handle, said teeth being arcuately curved to retain the blooms pulled from their stems, a serrated plate movable over the face of said teeth, the serrations in said plate substantially fitting said teeth at and extending substantially only to their rear faces.

4. A rake for dandelions and the like, comprising a handle with a head carried thereby, said head having curved teeth adapted to slide over the ground with the body of the teeth in close proximity, said teeth being set close together to gather blooms from the ground and serving to retain them thereon, and a cleaner for removing an accumulation of blooms at a single operation from said teeth.

5. A rake for dandelions and the like, comprising a handle with a head carried thereby, said head having curved teeth adapted to slide over the ground with the body of the teeth in close proximity, said teeth being set close together to gather blooms from the ground and serving to retain them thereon, a cleaner for removing an accumulation of blooms at a single operation from said teeth, and means operable from the upper end of said handle for actuating said cleaner.

Signed in the presence of two subscribing witnesses.

CHARLES E. ROBERTS.

Witnesses:
JOHN P. GIBSON,
ESTHER ABRAMS.